United States Patent [19]
Fujii et al.

[11] 4,104,079
[45] Aug. 1, 1978

[54] METHOD OF REMOVING SCALE CAUSED BY RAFFINATE IN A PHOSPHORIC ACID PURIFICATION PROCESS

[75] Inventors: Sakumi Fujii; Masao Uchida; Osamu Watanabe, all of Shin-nanyo, Japan

[73] Assignee: Toyo Soda Manufacturing Co., Ltd., Japan

[21] Appl. No.: 786,191

[22] Filed: Apr. 11, 1977

[30] Foreign Application Priority Data

Apr. 16, 1976 [JP] Japan .................................. 51-42413

[51] Int. Cl.$^2$ ............................................... B08B 3/08
[52] U.S. Cl. ....................................... 134/2; 134/22 R; 134/22 C; 423/321 S
[58] Field of Search ................. 134/2, 22 R, 22 C, 29; 423/321 S; 252/156

[56] References Cited

U.S. PATENT DOCUMENTS

| 3,360,399 | 12/1967 | Knox et al. | 134/29 X |
| 3,684,439 | 8/1972 | Rose et al. | 423/321 S |
| 3,937,783 | 2/1976 | Wamser et al. | 423/321 S X |
| 3,965,238 | 6/1976 | Tabata et al. | 423/321 S X |

FOREIGN PATENT DOCUMENTS 43,867  1/1961  Poland .................................. 134/22 R Primary Examiner—S. Leon Bashore
Assistant Examiner—Marc L. Caroff
Attorney, Agent, or Firm—Oblon, Fisher, Spivak, McClelland & Maier

[57] ABSTRACT

A scale deposited from a raffinate in a purification of a wet process phosphoric acid with an organic solvent or a mixture of an organic solvent and a strong acid by an extraction method is contacted with a solution containing a strong base to react with iron and aluminum components in the scale.

3 Claims, No Drawings

METHOD OF REMOVING SCALE CAUSED BY RAFFINATE IN A PHOSPHORIC ACID PURIFICATION PROCESS

BACKGROUND OF THE INVENTION

1. Field of the Invention

The present invention relates to a method of removing a scale caused by a raffinate. More particularly, it relates to a method of removing the scale deposited from a raffinate in a purification of a phosphoric acid prepared by a wet process with an organic solvent or a mixture of an organic solvent and a strong acid by an extraction method which comprises contacting the scale with a solution containing a strong base.

2. Description of the Prior Art

It has been known that the phosphoric acid prepared by decomposing a phosphate rock with a mineral acid such as sulfuric acid (hereinafter referring to as a wet process phosphoric acid) is purified by an extraction method with an organic solvent which is miscible to phosphoric acid but has low mutual solubility to water such as various alcohols, ketones, ethers and phosphoric acid esters.

The wet process phosphoric acid includes various impurities derived from the phosphate rock such as iron and aluminum compounds.

In the extraction method, the impurities are precipitated as a mixture containing main components of iron and aluminum phosphates.

The precipitate is deposited as a scale to clog an extracting apparatus especially an outlet of the raffinate, a solvent recovering device for recovering a solvent from the raffinate and fittings such as pipes for connecting the devices.

It has been known to prevent the deposition of the scale by a method of using an organic acid containing a strong acid such as sulfuric acid, hydrochloric acid or nitric acid. However, it is difficult to prevent the deposition of the scale when the concentration of $P_2O_5$ in the raffinate is lower than certain limit.

The inventors have studied the formation of the scale and have found that the composition and the amount of the scale has close relation to the concentration of $P_2O_5$ in the raffinate as follows.

When the concentration of $P_2O_5$ in the raffinate is higher than 20 wt.%, the scale is not substantially deposited, whereas when it is less than 20 wt.%, the scale is deposited.

The composition of the scale deposited in 5 to 20 wt.% of the concentration of $P_2O_5$ in the raffinate, contains main components of iron and aluminum phosphates. The deposition of the scale can be prevented by using a mixture of an organic solvent and a strong acid as a solvent for extraction.

When the concentration of $P_2O_5$ in the raffinate is lower than 5 wt.%, the amount of the scale deposited, is remarkably increased and the composition of the scale is a mixture containing main components of titanium and zirconium phosphates which is different from the former scale and is substantially insoluble in a strong acid to firmly deposite.

In the method of preventing the deposition and accumulation of the scale from the raffinate by contacting a mixture of an organic solvent and a strong acid with the wet process phosphoric acid, the composition and the properties of the scale are different depending upon the concentration of $P_2O_5$ in the raffinate. Accordingly, the deposition and accumulation of the scale are not always prevented by the method of treating with a strong acid.

The inventors have found the above-mentioned facts and considered to overcome the technical problem and have studied various methods of removing the scale which is firmly deposited.

SUMMARY OF THE INVENTION

It is an object of the present invention to provide a method of removing a scale deposited from a raffinate in a purification of a wet process phosphoric acid with an organic solvent or a mixture of an organic solvent and a strong acid by an extraction method.

Another object of the present invention is to provide a method of removing a scale deposited from a raffinate containing less than 20 wt.% of $P_2O_5$ which contains main components of iron and aluminum phosphates.

The other object of the present invention is to provide a method of removing a scale deposited from a raffinate containing less than 5 wt.% of $P_2O_5$ which contains main components of titanium and zirconium phosphates.

The foregoing and other objects of the present invention have been attained by providing a method of removing a scale deposited from a raffinate in a purification of a wet process phosphoric acid with an organic solvent or a mixture of an organic solvent and a strong acid by an extraction method which comprises contacting the scale with a solution containing a strong base to react them.

DETAILED DESCRIPTION OF THE PREFERRED EMBODIMENTS

The organic solvent extraction method for purifying the wet process phosphoric acid has been carried out by various known methods wherein the wet process phosphoric acid is extracted with an organic solvent which is miscible to phosphoric acid but has low mutual solubility to water such as various alcohols, ketones, phosphoric acid esters and ethers as an extracting solvent and phosphoric acid is back-extracted from the extract phase containing phosphoric acid.

Thus, the wet process phosphoric acid contains said cationimpurities which are bonded to phosphoric acid to remain in the raffinate by the purification and it is difficult to obtain a pure phosphoric acid in high yield.

In order to obtain the pure phosphoric acid in high yield, a strong acid is added to the organic solvent whereby the cation impurities which are bonded to phosphoric acid in the wet process phosphoric acid are dissociated to form free phosphoric acid and the extraction of phosphoric acid to the organic solvent is improved.

Thus, when the concentration of $P_2O_5$ in the raffinate is less than 5 wt.%, even though the strong acid is added, as described above, it disadvantageously causes the deposition and the accumulation of the scale which has different composition and property and is firmly deposited.

The composition of the scale deposited in the case of less than 5 wt.% of $P_2O_5$ in the raffinate comprises the following components though it is slightly different in the positions deposited.

$P_2O_5$ :22 to 37%
Ti:10 to 15%
Zr :8 to 10%
Fe :1 to 3%

Al : 0.1 to 1%

The scale contains the main components of titanium and zirconium phosphates which are bonded in complicated form with iron and aluminum phosphates. Even though the scale is contacted with a strong acid, the scale is not substantially changed.

However, when the scale is contacted with a solution containing a strong base, the scale is corroded in a short time to be easily peeled off even though the scale is deposited on the inner surface of the apparatus and the scale can be easily removed.

The reason of phenomenon is not clear however it is considered that iron and aluminum components which are unevenly distributed in the scale are converted to hydroxides thereof by reacting iron and aluminum components with the strong base whereby the scale is locally corroded to peel off the scale in the flaky form.

The solutions containing the strong base used in the invention can be solutions of sodium hydroxide, potassium hydroxide, calcium hydroxide, barium hydroxide or a mixture thereof. It is preferable to use an aqueous solution of sodium hydroxide having more than 5 wt.% of concentration.

When the scale is removed from the apparatus and pipes, the ratio of the solution of strong base to the scale is preferably in a range of 50 : 1 to 5 : 1 by weight, and the scale can be removed in a contact time of 3 to 24 hours.

The effect is not highly affected by the temperature. The temperature in the operation can be the room temperature and also can be higher than the room temperature so as to easily react the scale with the strong base.

The contact condition can be stationary, however the contact time can be shortened by recycling the solution containing a strong base by a pump.

On the peeled scale, colloidal hydroxides are formed however, the hydroxides are adhered on the insoluble solid components and have relatively high sedimentation velocity whereby it is possible to separate the insoluble solid components from the solution containing the strong base in a precipitation separator. The separated supernatant of the solution containing the strong base can be reused with an additional strong base.

When sodium hydroxide is used, the solution obtained by separating the insoluble solid components can be also used as $Na^+$ source for removing Si and F impurities from the wet process phosphoric acid (primary purification).

The most important feature of the present invention is to decompose the scale containing the main components of titanium and zirconium phosphates deposited from the raffinate having less than 5 wt.% of the concentration of $P_2O_5$ by reacting the strong base with the minor components of iron and aluminum phosphates which are locally and unevenly distributed to convert them to iron and aluminum hydroxides.

The reaction is unique reaction since the main components of the scale remain in the insoluble form, and the minor components of the scale such as iron and aluminum phosphates are locally and unevenly distributed because of the affinity and the minor components are converted by the reaction with the strong base. The concentration of the strong base is important and is more than 5 wt.% preferably 5 to 60 wt.% especially 7 to 50 wt.%.

An alkali metal hydroxide is preferably used, as the strong base, an alkaline earth hydroxide can be used to modify the insoluble components peeled off.

The invention will be further illustrated by certain examples wherein the percent means percent by weight.

EXAMPLE 1

In a phosphoric acid purification system described in U.S. Pat. No. 3,920,797, 1 wt. part of a wet process phosphoric acid (35 wt.% of $P_2O_5$) 10 wt. parts of i-amyl alcohol containing 0.5 wt.% of hydrochloric acid were counter-currently contacted in an extraction battery having 16 to mixer-settlers to obtain the raffinate having the following components wt.% and so forth:

$P_2O_5$ : 2%
Fe : 0.6%
Ti : 200 ppm
Al : 0.5%
Zr : 150 ppm
HCl : 5%
i-amyl alcohol : 1.5%

The raffinate was recycled through a pipe made of polyvinyl chloride (length: 5 m; inner diameter: 77 mm) at a flow rate of 5 $m^3$/hr. for 30 days. As the result, about 5 Kg of scale which have 5 to 10 mm layer was deposited and accumulated on the inner surface of the pipe.

The scale contained the following components:

$P_2O_5$:30%
Zr:8%
Al:0.1%
Ti:10%
Fe:1%

The raffinate in the pipe on which the scale was deposited was washed with water and 150 Kg of 20% aqueous solution of sodium hydroxide was recycled by a pump at a flow rate of 1 $m^3$/hour for 5 hours.

The aqueous solution of sodium hydroxide was discharged from the pipe and the condition of the adhesion of the scale in the inner surface was observed. The scale was substantially removed from the inner surface of the pipe.

EXAMPLE 2

The pipe made of polyvinyl chloride (length: 5 m; inner diameter: 77 mm) on which the scale was deposited in Example 1, was used, and 200 Kg of 10% aqueous solution of calcium hydroxide was recycled by a pump at a flow rate of 2 $m^3$/hour for 10 hours. The scale was substantially removed as the same with Example 1.

EXAMPLE 3

In a phosphoric acid purification system, 1 wt. part of a wet process phosphoric acid (35% of $P_2O_5$) and 4 wt. parts of n-butanol were counter-currently contacted in an extraction battery having 8 mixer-settlers to obtain the raffinate having the following components:

$P_2O_5$ : 7%
Al : 0.7%
Fe : 0.8%
Ti : 100 ppm
n-butanol : 5%

The raffinate was recycled through a pipe made of polyvinyl chloride (length: 10 m; inner diameter: 77 mm) at a flow rate of 3 m$^3$/hr. for 50 days. As the result, about 7 Kg of scale which have 5 to 7 mm layer was deposited and accumulated on the inner surface of the pipe.

The scale contained the following components:

$P_2O_5$ : 25%
Al : 8%
Ca : 2%
Fe : 10%
Ti : 0.3%

The raffinate in the pipe was washed with water and 200 Kg of 15% aqueous solution of potassium hydroxide was recycled at a flow rate of 2 m$^3$/hr. for 10 hours.

The scale was substantially removed as the same with Example 1.

EXAMPLE 4

In a phosphoric acid purification system, 1 wt. part of a wet process phosphoric acid (32% of $P_2O_5$) and 7 wt. parts of n-butanol containing 1.7% of hydrochloric acid were counter-currently contacted in an extraction battery having 16 mixer-settlers to obtain the raffinate having the following components:

$P_2O_5$ : 1%
Fe : 0.8%
Ti : 300 ppm
Al : 0.7%
Zr : 200 ppm
HCl : 7%
n-butanol : 5%

The raffinate was fed into a packed tower (diameter: 1 m; packed height : 8 m), at a flow rate of 3 m$^3$/hr. to counter-currently contact with a steam at a rate of 0.5 ton/hr. to continuously carry out the distillation at 92° to 95° C under the atmospheric pressure for 10 days and n-butanol was recovered. As the result, about 200 Kg of scale was deposited in the packed tower to cause difficult for continuing the distillation.

The scale contained the following components:

$P_2O_5$ : 37%
Zr : 10%
Al : 0.4%
Ti : 15%
Fe : 3%

The raffinate in the packed tower was discharged from the bottom of the packed tower and 2000 Kg of 48% aqueous solution of sodium hydroxide was fed into the packed tower and water was filled in the tower to the packed top and it was kept in stationary for 16 hours.

Then, the aqueous solution of sodium hydroxide was replaced to water and the inner part of the packed tower was observed. The scale was substantially removed.

What is claimed is:

1. In a method of removing adhered scale which deposits on surfaces of process apparatus when said surfaces are in contact with a raffinate obtained by extracting wet process phosphoric acid with an organic solvent or a mixture of an organic solvent and a strong acid, the improvement which comprises contacting said scale with an aqueous solution having a concentration of greater than 5 wt. % of at least one strong base selected from the group consisting of sodium hydroxide, potassium hydroxide, calcium hydroxide and barium hydroxide for a time sufficient to remove said scale from said surfaces.

2. The method of claim 1, wherein the scale is formed from a raffinate having less than 20 wt.% of $P_2O_5$.

3. The method of claim 1, wherein the scale is formed from a raffinate having less than 5 wt.% of $P_2O_5$.

* * * * *